United States Patent
Tsai et al.

(10) Patent No.: US 8,751,699 B1
(45) Date of Patent: Jun. 10, 2014

(54) SYSTEMS AND METHODS FOR INDICATION OF ACTIVITY STATUS OF A STORAGE DEVICE

(75) Inventors: Chun Sei Tsai, Tustin, CA (US); Kavita S. Patil, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 168 days.

(21) Appl. No.: 13/335,698

(22) Filed: Dec. 22, 2011

(51) Int. Cl.
*G06F 3/00* (2006.01)

(52) U.S. Cl.
USPC .................................. 710/17; 710/6; 710/18

(58) Field of Classification Search
USPC ................................................. 710/6, 17, 18
See application file for complete search history.

(56) References Cited

U.S. PATENT DOCUMENTS

| | | | |
|---|---|---|---|
| 6,772,031 B1 * | 8/2004 | Strand | 700/108 |
| 6,952,828 B2 * | 10/2005 | Greene | 718/104 |
| 8,255,618 B1 * | 8/2012 | Borchers et al. | 711/103 |
| 2003/0084086 A1 * | 5/2003 | Simpson et al. | 709/102 |
| 2006/0195904 A1 * | 8/2006 | Williams | 726/24 |
| 2006/0294507 A1 * | 12/2006 | Buskens et al. | 717/133 |
| 2008/0279167 A1 * | 11/2008 | Cardei et al. | 370/342 |
| 2010/0169603 A1 * | 7/2010 | Perry | 711/167 |
| 2011/0055431 A1 | 3/2011 | Fulkerson et al. | |
| 2013/0061249 A1 * | 3/2013 | Schwartz et al. | 719/318 |

* cited by examiner

*Primary Examiner* — Farley Abad

(57) ABSTRACT

Systems and methods for indication of activity status of a storage device is described. In one embodiment, an exemplary method comprises receiving, from a digital device, a status request requesting availability of a storage device, determining if one or more background tasks are being performed by the storage device, determining if one or more background tasks are pending to be performed by the storage device, generating a level of urgency indicator based on the determination of the one or more background tasks that are being performed and the determination of the one or more background tasks that are pending to be performed by the storage device, and providing the level of urgency indicator to the digital device.

28 Claims, 8 Drawing Sheets

SYSTEMS AND METHODS FOR INDICATION OF ACTIVITY STATUS OF A STORAGE DEVICE

BACKGROUND

1. Field of the Invention

The present invention generally relates to providing an indication of performance of a storage device. More particularly, the invention relates to systems and methods for indication of an activity status of a storage device.

2. Description of Related Art

In a contemporary hard disk drive (HDD) design, maintenance work performed in the background becomes an integral part of drive activities. Maintenance, such as cache flush, adjacent track interference refresh, and disk scan for grown defects are considered essential for data integrity and drive reliability protection. Since host commands are considered the highest priority in terms of command execution, however, such maintenance work may be deferred until the drive is idled. Unfortunately, in a high duty cycle environment, such maintenance may be deferred until some of the background activities become critical. In those situations, the performance of critical background activities may result in an undesired loss in host performance (but not loss in data integrity due to safeguards in the system).

In existing systems, a hard disk drive performing critical background activities may not be acceptably responsive to a host computer. The host computer may then be forced to wait to retrieve data from or wait to have data written to the hard disk drive.

Some systems allow the host computer to write data to or retrieve data from multiple hard disk drives (e.g., a host computer in communication with a data farm). If a first hard disk drive is otherwise occupied with background activities, the host computer may wait a period of time and, if the first hard disk drive remains occupied or busy performing other tasks, the host computer may then redirect the task to a second hard disk drive. The wait time, however, is an inefficient use of resources. Further, the second hard disk drive may also be occupied and therefore requiring additional wait time.

DETAILED DESCRIPTION OF THE INVENTION

In order for a host computer to efficiently utilize one or more hard disk drives it is desirable that drive maintenance be scheduled in order to avoid untimely loss in performance. In various embodiments, a host computer, or any digital device, may provide a data storage device with a status request such as a service interval (SII). The data storage device may return a level of urgency (LoU) indicator regarding active or pending background tasks. The host computer may then adjust activities to accommodate the background activities.

The LoU indicator may be in the form of a numerical output that is proportional to an amount of time to complete one or more background tasks. The LoU indicator may supplement a user's or host computer's decisions. Various embodiments ensure that the user data is protected at all times.

In some embodiments, the LoU indicator may provide a guideline to the end-user or host computer for better utilization of drive idle times between user commands. With this information, the end-user or host computer can be better informed regarding the status of the drive. As a result, data storage devices may provide more robust performance.

Figure 1:
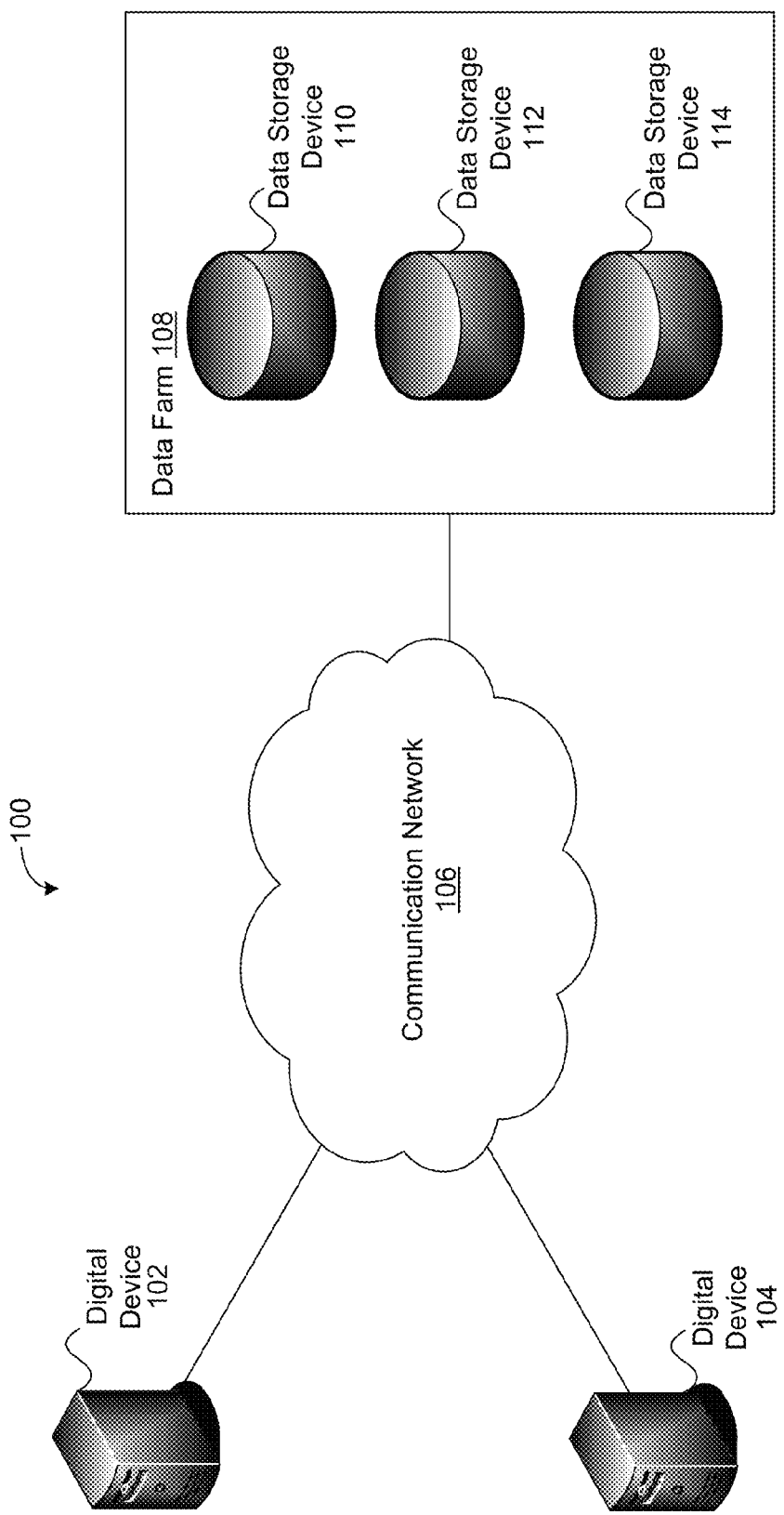
FIG. 1 is a diagram of an environment in which some embodiments may be practiced.

FIG. 1 is a diagram of an environment 100 in which some embodiments may be practiced. The environment 100 comprises two digital devices 102 and 104 as well as data farm 108 which communicate over communication network 106. In one example, digital device 102 offers cloud or network storage services to one or more users through the communication network 106. Digital device 104 may utilize cloud or network storage services provided by the digital device 102. The digital device 102 may manage or direct the data farm 108 as a part of the cloud or network storage services. The data farm 108 may comprise any number of data storage devices 110-114 for the purpose of storing or providing access to data. In one example, the digital device 102 is a part of the Amazon Simple Storage Service (S3). The digital device 102 may utilize one or more data farms 108 to provide storage and retrieval of data over a network (e.g., communication network 106) to the digital device 104.

Figure 8:
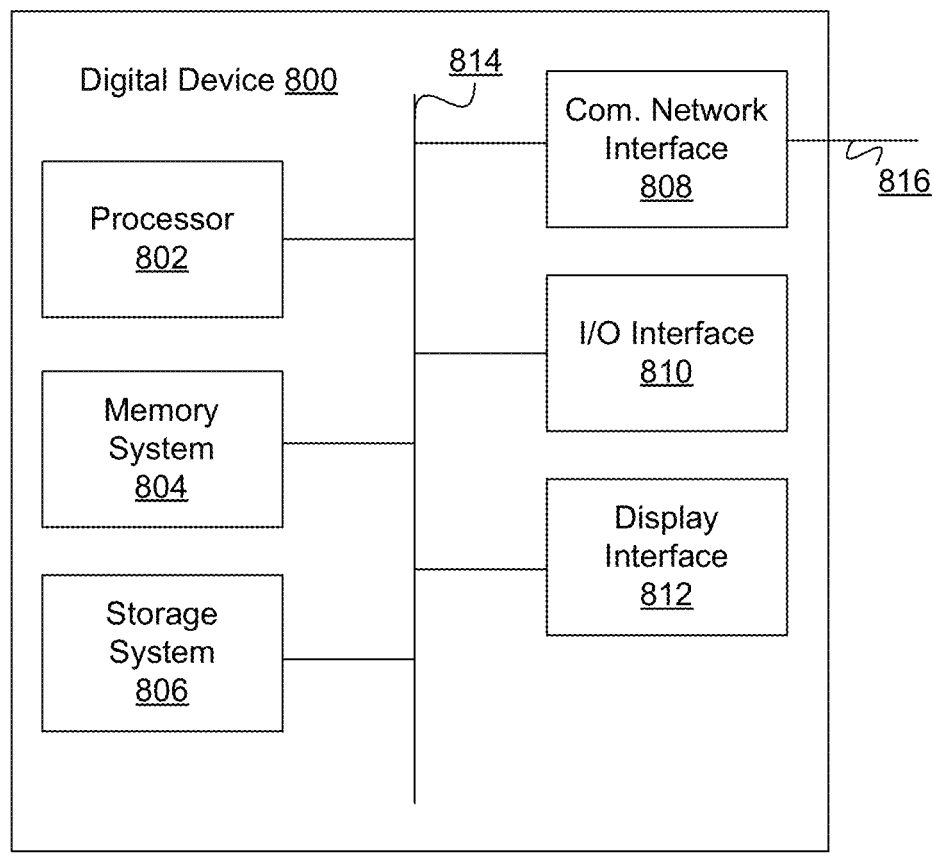
FIG. 8 is a digital device in some embodiments.

A digital device is any device with memory and a processor. For example, the digital device 102 and/or the digital device 104 may comprise computers, servers, laptops, smartphones, netbooks, personal digital assistants, tablets, media players, or the like. In one example, the digital device 102 is a server that controls and/or directs one or more data storage devices of the data farm 108. The digital device 104 may be any digital device with network access that may provide or retrieve data through the services offered by digital device 102. The digital device 104 may be controlled by an end-user or customer. An exemplary digital device is depicted in FIG. 8.

In some embodiments, the digital device 102 or the digital device 104 may be referred to as a host computer or host. A host computer is any digital device that may provide a status request to the data farm 108 and/or one or more of the data storage devices 110-114. The host computer may provide commands such as read or write data, to the data farm 108 and/or one or more data storage devices 110-114.

The communication network 106 is any network configured to allow communication between any number of digital devices 102, 104, data farms 108, and/or data storage devices 110. The communication network 106 may be the Internet, a LAN, WAN, or any other network. The communication network 106 may be wired, wireless, or a combination of both.

The data farm 108 may be any digital device or collection of digital devices that provides access to data to one or more data storage devices 110-114. In one example, the data farm 108 includes one or more servers that manage, control and/or provides access to the data storage devices 110-114. In some embodiments, the data farm 108 may comprise a plurality of data farms, each data farm comprising one or more data storage devices.

The data storage devices 110-114 are any devices that include at least one computer readable medium. A computer readable medium is any medium configured to store data such as files or executable instructions. In one example, the data storage device 110 may include, but are not limited to, any number hard disk drives (HHDs), solid state drives (SSDs), or hybrid drives. In some embodiments, the data storage device 110-114 may include any number of computer readable mediums. For example the data storage device 110 may comprise an array of hard disk drives (e.g., a RAID array).

The digital device 104 may utilize the services of digital device 102 to store or retrieve data from the data storage devices 110-114. The digital device 102 or digital device 104 may store data in or retrieve data from data storage device 110.

In order to manage multiple data storage devices, the digital device 102 may inquire the status of the data storage devices. If one of the data storage devices is performing critical tasks (e.g., background tasks) or is otherwise occupied, the digital device 102 may identify another data storage device to perform tasks. As a result, performance is improved and background tasks may be completed without loss of performance.

In various embodiments, the digital device 102 or digital device 104 may provide a status request to the data farm 108 to determine the status of the data storage device 110. In some embodiments, the status request may be provided to the data storage device 110. The data storage device 110 may determine an indication of performance based on current and pending tasks of one or more of the storage devices (e.g., computer readable media). Those skilled in the art will appreciate that the data storage device 110 may determine the performance of one or more storage devices at any time. For example, the data storage device 110 may not require a status request in order to begin the determination of performance.

In determining performance, the data storage device 110 may determine if background tasks are currently being performed and/or background tasks are about to be performed. The data storage device 110 may then generate a level of urgency (LoU) indicator based on the background tasks being performed and/or the background tasks that are about to be performed. The LoU indicator may be a value that represents an amount of time recommended or expected for the data storage device 110 to complete one or more tasks. In one example, the LoU indicator is a value from 0 to 6 which represents an amount of time that the data storage device 110 should perform one or more background tasks. In various embodiments, the LoU indicator may include a percentage of performance available to a digital device or end-user while the data storage device 110 completes the background tasks.

In some embodiments, the data storage device 110 may determine if any background tasks currently being performed may be interrupted and/or if background activities that are about to be performed are deferrable. The LoU indicator may be based on interruptability or deferability of background activities.

The digital device 102, digital device 104, or data farm 108 may select a different data storage device (e.g., data storage device 112) based on the LoU indicator from the data storage device 110. In some embodiments, the digital device 102, digital device 104, or data farm 108, may receive a LoU indicators indicating the state of various data storage device 110-114 and allocate instructions to the different data storage devices based on the LoU indicators to improve performance.

Those skilled in the art will appreciate that there may be only digital device 102 or 104. For example, a user of a digital device 102 may retrieve or store data on a plurality of data storage devices without utilizing third-party cloud or network services and, therefore, may retrieve from and/or store data to the data storage devices without digital device 104. In one example, the digital device 102 may be coupled to a RAID array of data storage devices (e.g., locally or through a network). In some embodiments, there is no communication network 106 and no data farm 108. For example, one or both digital devices 102 and 104 may be coupled directly to two or more data storage devices.

Figure 2:
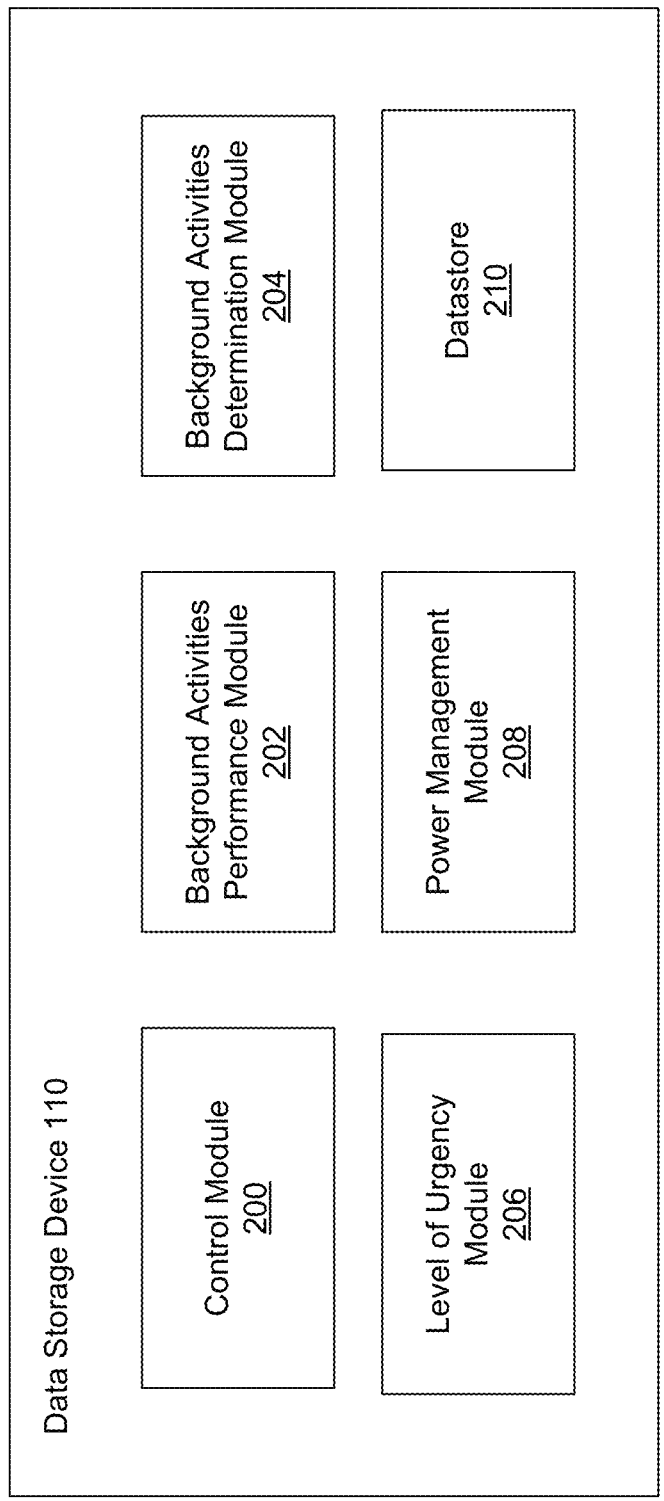
FIG. 2 is a block diagram of an exemplary data storage device in some embodiments.

FIG. 2 is a block diagram of an exemplary data storage device 110 in some embodiments. In various embodiments, the data storage device 110 may receive a status request requesting a status of performance of the data storage device 110. The data storage device 110 may determine if a background task is currently being performed and if one or more background tasks are pending. The data storage device 110 may generate an LoU indicator based on the background tasks that are being performed and/or pending. The LoU indicator may then be provided to the requestor. The data storage device 110 comprises a control module 200, a background activities performance module 202, a background activities determination module 204, a level of urgency (LoU) module 206, a power management module 208, and a datastore 210.

The control module 200 is configured to receive the status request from a digital device and provide the LoU indicator. In some embodiments, the control module 200 may comprise a processor, digital signal processor, firmware, or control circuitry. In various embodiments, the control module 200 may comprise software.

The status request may be executed via SMART Command Transport (SCT). The status request (i.e., status SII) may be deployed using a VSTAT command (Vender Specific Command) which may have information regarding the status of the drive for background activities such as DLG.

The background activities performance module 202 may identify any background tasks that are currently being performed by the data storage module 110. The background activities determination module 204 may identify background tasks that are to be performed (e.g., background tasks that are pending) by the data storage module 110. Background tasks may include, but are not limited to:
    a. Data lifeguard (DLG) I (e.g., read scan)
    b. DLG II/III (e.g., write back, data refresh)
    c. Reserve Area Robustness (RAR)
    d. Grease Wear Leveling (GWL)
    e. DRM Flush
    f. Cache Flush
    g. Distributed Test Process Lite (DTPL)
    h. Shingle Garbage Collection/Defrag
    i. Closed Loop Dynamic Fly Height (CLDFH) Calibration
    j. Pseudo Cache (e.g., Media Cache) flush Data Lifeguard (DLG) may automatically identify and repair sectors before data loss occurs. In various embodiments, user sectors on the data storage device 210 are scanned (e.g., DLG I) during times of inactivity from the host. Sectors requiring extended retries to recover are rewritten and read back to ensure the storage integrity of the sector. If read back performed is still less than optimal, the sector will be relocated to a new good sector (e.g., DLG III). Data Lifeguard may be actively guarding data, even if S.M.A.R.T. operations for monitoring and predicting hard drive performance are disabled.

DLG I may comprise scanning the media of the data storage device. In some embodiments, the scanning may be interrupted or deferred if commands are received from the host computer. DLG II/III may comprise rewriting. In various embodiments, it may not be recommended that certain tasks, such as DLG II/III be interrupted or deferred or that they not be interrupted or deferred past a predetermined amount of time.

The reserve area robustness (RAR) is a process where reserve information may be preserved in a manner similar to the DLG. Grease wear leveling (GWL) is a process in which the actuator may be moved (e.g., vertically) a limited number of times. DRM flush and cache flush may flush one or more caches. The distributed test process lite (DTPL) may manage a portion of storage media (e.g., a portion of the hard drive) by testing, correcting, partitioning, and/or zeroing out a part of the media. In various embodiments, the DTPL is an extension of a process that may begin at a factory.

The shingle garbage collection/defrag moves user data from where the data may have been initially written to the media of the data storage device 110. In some embodiments, the data may be moved such that retrieval of the information may be more efficient. The closed loop dynamic fly height (CLDFH) calibration may calculate the atmospheric pressure to calibrate the height of a head over the readable media (e.g., 1.3 nanometers) of the data storage device 110. Pseudo cache (e.g., media cache) flush may flush the data of one or more caches.

Those skilled in the art will appreciate that many background tasks discussed herein represent one or more background tasks that may be performed by data storage devices manufactured, sold, and/or distributed by the assignee of this patent application. Any task or service performed on or by the data storage device regardless of manufacturer, seller, distributor, or disk management software author may be a background task. For example, background tasks may include, but are not limited to, data integrity services, testing of media, testing for and correction of adjacent track interference (ATI), protection of reserve area, shingle writing data management tasks, book-keeping tasks such as cache flushes, defect management tasks, prevention of grease buildup, protection against altitude change, and protection against performance loss.

In various embodiments, one or more of the tasks may be interruptible and/or deferred. For example, if data storage device 110 is currently scanning the media as per DLG I, the process may be interrupted should a command from the host (e.g., digital device 102) be received. Similarly, if the data storage device 110 is to perform the scan in the near future (DLG I scanning is calendared to occur), the process may be deferred until after tasks commanded by the host are completed. Alternately, DLG III may take several minutes to complete and it may not be recommended that the task be interrupted or deferred.

Table 1 includes a list of exemplary tasks and recommended and estimated times to complete those tasks:

TABLE 1

| Background Task | Est. Time Required |
| --- | --- |
| DST 1 | 2 mins |
| DST 2 | Vary |
| DST 3 | 6 mins |
| DST 4 | Vary |
| OL (DLG 1) | Vary |
| DTPL | Vary |
| DLG II | Vary |
| DRM Flush | 100 ms |
| WLL Flush | 100 ms |
| WL | 100 ms |
| GWL | 100 ms |
| DFH Cal | 100 ms |
| AZ Shifting | 100 ms |

The level of urgency module (LoU module) 206 may be configured to generate the LoU indictor. The LoU indicator may indicate performance or available performance of the data storage device. In some embodiments, the LoU indicator is a value that represents a recommended amount of time for the data storage device to complete one or more tasks. In one example, the LoU indicator is a value ranging from 0 (e.g., no activity) to 6 (e.g., high background activity) so that the user can adjust the host activities to accommodate the data storage device 110 in order to avoid affecting the performance. In exemplary embodiments, the LoU indicator may be proportional to the amount of time required to complete the remaining background activities. In some embodiments, the LoU indicator may be the amount of time estimated to complete one or more tasks currently being performed and/or one or more pending tasks.

In one example, the LoU indicator is the total amount of estimated time to complete background tasks without interruption by the host. Those skilled in the art will appreciate that the time may be estimated in many different ways. In one example in Table 2, time is approximated as follows:

TABLE 2

| Background Activity | Time Required | Comments |
| --- | --- | --- |
| DLG-1 | (max_LBA − current_LBA)/ average_SPT * Rev_Time | Usually in hundreds of minutes |
| DLG-II/3 | Refresh _Overhead * 4 * Number_of_Outstanding_ZIP _Codes | Usually in hundreds of minutes |
| DRM Flush | 200 msec | |
| GWL | 200 msec | |
| DST | Same as DLG-1 | |
| RAR | Same as DLG-II/3 | |
| Cache Flush | 1-10 seconds | |

The approximate time for the LoU indicatory may be the calculated sum of time of one or more background tasks being performed and/or are pending.

In some embodiments, the LoU module 206 may generate the LoU indicator based on those tasks that should not be interrupted and/or pending. For example, the background activities performance module 202 may identify a type of background activity being performed by the data storage device 110 as interruptible or not interruptible. The LoU module 206 may determine the approximate amount of time to complete any task that should not be interrupted and generate the LoU indicator based on the approximate time. The background activities pending module 204 may similarly identify a type of background activity that is currently pending as deferrable or not deferrable. The LoU module 206 may determine the approximate amount of time to begin and complete any task that should not be deferred and generate the LoU indicator based on the approximate time. Those skilled in the art will appreciate that the LoU module 206 may base the generation of the LoU indicator on both the approximate time to complete a task currently being performed by the data storage device 110 as well as the approximate time to begin and complete a task that is pending. The LoU module 206 may base the generation of the LoU indicator on any information regarding performance or available performance of the data storage device 110. The LoU indicator may comprise a discrete value (e.g., a discrete value between 0 to 6 representing the time to complete one or more tasks or percentage of performance available), a value indicating an approximate time when the data storage device 110 has completed one or more tasks, a value indicating an approximate length of time when the data storage device 110 has completed one or more tasks, a percentage representing an approximate time remaining, or the like.

In various embodiments, the data storage device 110 will always be responsive to the host computer regardless of background task being performed and/or background task that is pending. In one example, the data storage device 110 may interrupt or defer any background task upon receiving instructions from the host computer.

The LoU module 206 may generate a percentage representing an amount of performance available to a host (e.g., digital device 102) and/or availability of the data storage device 110. In one example, the data storage device 110 may reserve 5% of performance to complete one or more background tasks while providing approximately 95% of the rest of the performance of the data storage device 110 to the host. In some embodiments, the data storage device 110 may limit the amount of performance that is reserved for the performance of background tasks (e.g., the data storage device 110 will always dedicate at least 80% of the data storage device's performance to the host).

In various embodiments, the LoU module 206 and/or the data storage device 110 may share performance between a host and background tasks for a limited number of background tasks. For example, the LoU module 206 may only share performance between a host for offline scans, DTPL, and drive self tests (DSTs). If there is no background activity, the LoU indicator may be a value of 100% which indicates that there are no background tasks or the host does not need to throttle to allow background task completion.

The LoU module 206 may generate a percentage or a ratio indicating an allotment of performance or an approximate allotment of performance granted to a host while one or more background tasks are conducted. In one example, the LoU module 206 may generate a ratio of host-to-drive as the LoU indicator. The ratio of host-to-drive may be a recommended percentage of time to host activities and/or a recommended percentage of time to complete current active and pending background activities. In some embodiments, the LoU indicator may be a value that represents the percentage or ratio. For example, an LoU indicator of 1 may indicate a recommendation or indication that 1% of the performance of the data storage device 110 may be dedicated to completing an active or pending background activity while 99% of the remaining performance may be dedicated to the host. Table 3, below, includes exemplary LoU indicators with exemplary associated ratio of host-to-drive and an exemplary total time remaining for each indicator:

TABLE 3

| Total time Remaining | Ratio of Host to Drive (Percent) | LoU |
|---|---|---|
| 0 | 0% | 0 |
| 200 ms | 1% | 1 |
| 5 seconds | 2% | 2 |
| 2 minutes | 5% | 3 |
| 5 minutes | 10% | 4 |
| 50 minutes | 15% | 5 |
| 120 minutes | 20% | 6 |

The power management module 208 is configured to reduce the power of the data storage device 110 (e.g., place the data storage device 110 within a power management mode). In one example, the power management module 208 may receive a command to place the data storage device 110 within an "idle," "standby," "sleep" or other low power mode. The power management module 208 may then place the data storage device 110 within the low power mode (e.g., parking a drive head, reducing or stopping spinning of media, and the like).

In various embodiments, upon receiving a request from a host computer to enter into power management mode, the power management module 208 may request that an LoU indicator be generated by the LoU module 206. The LoU module 206 may generate the LoU indicator as discussed herein. The power management module 208 may store the LoU indicator within the media of the data storage device 110 (e.g., within the datastore 210). In some embodiments, the power management module 208 may store the LoU indicator within a cache or other memory.

For example, the data storage device 110 may be conducting or preparing to conduct background tasks when a host commands that the data storage device 110 enter into a power management mode. As a result, the data storage device 110 may enter into the power management mode and potentially postpone activities (e.g., such as background tasks). The data storage device 110 may engage in postponed background tasks after the data storage device 110 changes back into an active state (e.g., by receiving a command to "wake" or otherwise become active from the power management mode).

In some embodiments, a host computer or other digital device may request an LoU indicator by sending a status request from a data storage device 110 in a power management mode. Rather than changing the state of the data storage device 110 (e.g., "waking" the data storage device 110 from the reduced power mode), the power management module 208 may retrieve the previously generated LoU indicator from the media or cache and provide the LoU indicator to the host computer. The host computer may then be informed as to the tasks to be performed by the data storage device 110 without waking the data storage device 110 from the power management mode.

Those skilled in the art will appreciate that the LoU module 206 may, without request, generate an LoU indicator which may be logged and/or stored. For example, the LoU module 206 may generate an LoU indicator at predetermined times or upon the occurrence of one or more events. In some embodiments, when a status request is received the LoU module 206 may provide the most recently generated LoU indicator to the requesting digital device. In some embodiments, the LoU indicator may be provided to a digital device without waiting to receive the status request.

The datastore 210 is any data structure that may be stored in a computer readable medium. In one example, the data store 212 comprises a database, table, or other data storage structure.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, the functions of the various modules may be combined or divided differently.

Figure 3:
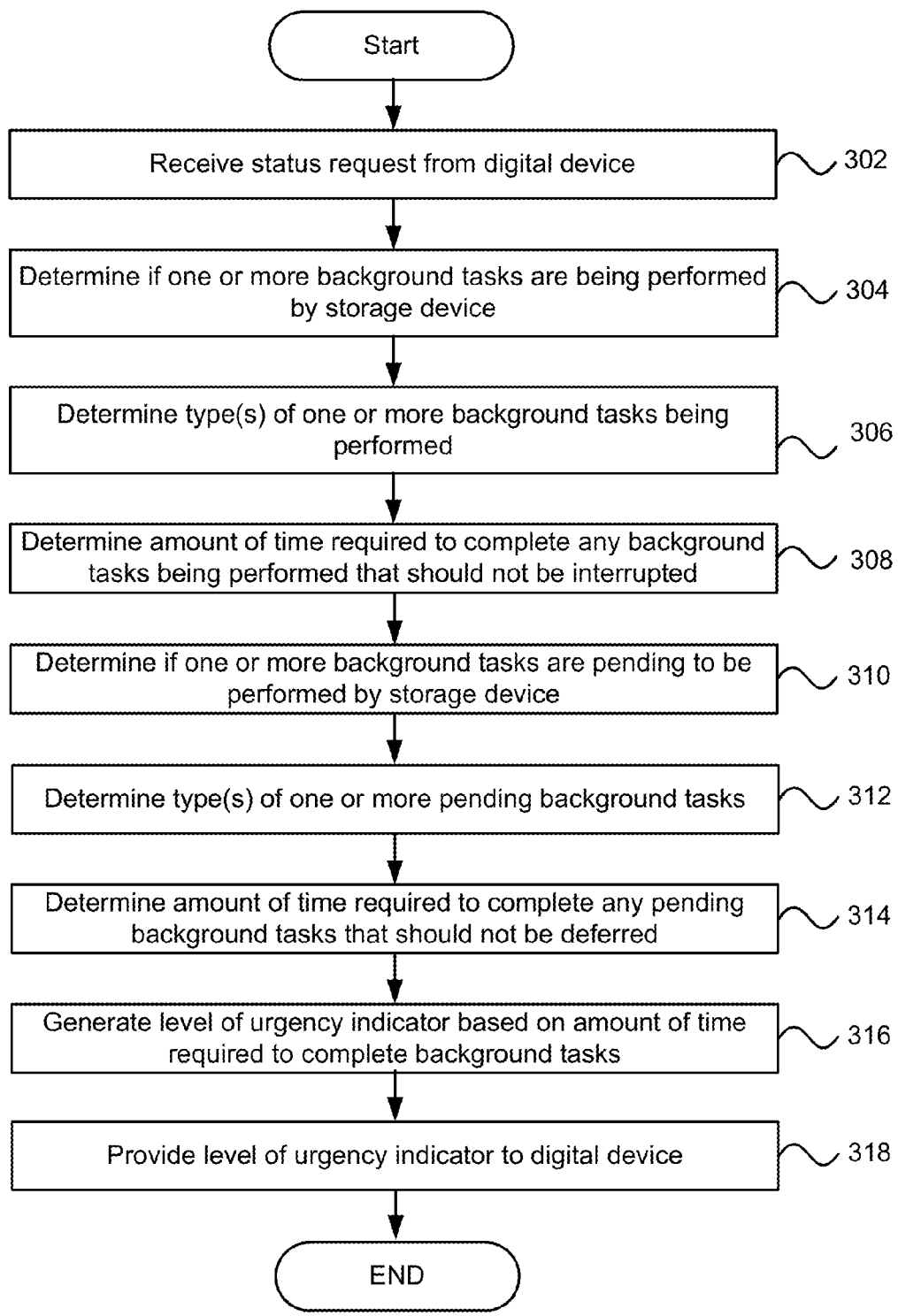
FIG. 3 is a flow diagram of an exemplary process for indication of activity status of a storage device.

FIG. 3 is a flow diagram of an exemplary process for indication of activity status of a storage device. In step 302, the control module 200 receives a status request from a digital device. The status request may be a vendor specific command. The control module 200 of the data storage device 110 may execute at host task level so that it does not alter the current drive operation. As discussed herein, there may be no media access for this command so that the power management state of the data storage device 110 may be maintained (e.g., the power management mode is unaltered). The format of the status request may be as follows:

TABLE 4

| Word | Name | Value | Description |
|---|---|---|---|
| 0 | Action Code | C006h | Get Level of Urgency indicator |
| 1 | Function Code | 0001h | Can add different functions |
| 2 | Password | 0 × C0D0E0A0 | Password |

In some embodiments, the status request may be encrypted and/or include a password. The control module 200 may decrypt the status request using an encryption key (e.g., previously stored within or accessible to the data storage device 110). The control module 200 may receive a password and authenticate the status request. In some embodiments, the status request may comprise a digital device or host identifier (e.g., instead of a password) to help identify the source of the request.

Those skilled in the art will appreciate that different status requests may come from different host computers. For example, different host computers may require different information. As a result, one host computer may receive an LoU indicator indicating a general value (e.g., 0-6) representative of the recommended amount of time to complete background tasks while another host computer may receive an LoU indicator indicating an amount of recommended time to complete the tasks.

In step 304, the background activities performance module 202 may determine if one or more background tasks are being performed by the data storage device 110. In various embodiments, the background activities performance module 202 logs and/or commands one or more background tasks to begin. The background activities performance module 202 may also log when the background tasks are complete.

In step 306, if one or more background tasks are being performed by the data storage device 110, the background activities performance module 202 determines the type(s) of the background tasks being performed. The type of task may include the actual task (e.g., DLG II) and/or may include whether a task may be interruptible or whether the task should not be interrupted.

In step 308, the background activities performance module 202 may determine an amount of time required to complete any background tasks being performed that should not be interrupted. In some embodiments, the background activities performance module 202 may identify each task that is of a type that indicates that the task should not be interrupted. The background activities performance module 202 may then estimate the amount of time to complete the task. The background activities performance module 202 may add the time to complete the different background tasks that should not be interrupted.

In step 310, the background activities determination module 204 may determine if one or more background tasks are pending (e.g., to be being performed by the data storage device 110). In various embodiments, the background activities determination module 204 logs and/or commands one or more background tasks are to begin. The background activities determination module 204 may also log when the background tasks have begun and/or when the background tasks are complete.

In step 312, if one or more background tasks are pending to be performed by the data storage device 110, the background activities determination module 204 determines the type(s) of the background tasks to be performed. The type of task may include the actual task (e.g., DLG II) and/or may include whether a task may be deferrable or whether the task should not be deferred.

In step 314, the background activities determination module 204 may determine an amount of time required to complete any background tasks to be performed that should not be deferred. In some embodiments, the background activities determination module 204 may identify each task that is of a type that indicates that the task should not be deferred. The background activities determination module 204 may then estimate the amount of time to complete the task. The background activities determination module 204 may add the time to complete the different background tasks that should not be deferred.

In step 316, the LoU module 206 may generate the LoU indicator based on the estimated time required to complete the background tasks. For example, the LoU module 206 may add the time to complete the different background tasks that should not be interrupted with the time to complete the tasks that should not be deferred. The LoU module 206 may then include the times directly within an LoU indicator to provide to the requesting digital device, may generate a value (e.g., a discrete value) representing a range of recommended time for the data storage device 110 to complete the tasks, provide a ratio of the amount of performance available to the digital device, and/or provide a percentage of performance of the data storage device 110 available to the digital device.

In some embodiments, the LoU module 206 generates the LoU indicator assuming that performance of one or more background tasks by the data storage device 110 will not be slowed, interrupted, or deferred. In one example, the background activities performance module 202 and the background activities determination module 204 may identify background tasks that are being performed or pending. Subsequently, the background activities performance module 202 and the background activities determination module 204 may estimate a time to complete one or more of the background tasks assuming that the tasks are not slowed, interrupted, or deferred due to commands from a host computer or other user (e.g., assuming that the data storage device 110 will not receive commands from a host computer to read data from or write data to computer readable storage media). The LoU module 206 may generate the LoU indicator based on the estimated time (based on these assumptions) from the background activities performance module 202 and the background activities determination module 204.

The LoU module 206 may generate the LoU indicator based on a comparison of the time recommended to complete one or more background tasks with one or more predetermined thresholds. If the time to complete the pending and currently performed tasks (e.g., those tasks that are recommended that should not be interrupted or deferred) is lower than a first threshold, the LoU module 206 may generate an LoU indicator of value one or zero. If the time is between a first and second threshold, the LoU module 206 may generate an LoU indicator value of one or two, and so on.

In some embodiments, the LoU indicator may be formatted as follows:

TABLE 5

| Field Name | Value |
|---|---|
| Error | See ATA/ATAPI-7 |
| Sector Count | Reserved |

TABLE 5-continued

| Field Name | Value |
| --- | --- |
| LBA Low Bits 7:0 | Ratio of host to background activity required to complete background activity (in case of background activity is marked urgent) |
| LBA Mid Bits 15:8 | Level of Urgency Indicator |
| LBA High Bits 23:16 | Percentage remaining of activities such as offline scan, DTPL (0..9) |
| Device | Reserved |
| Status | See ATA/ATAPI-7 |

Those skilled in the art will appreciate that the LoU module 206 may generate LoU indicators at any time. In some embodiments, at any time or at predetermined times, the background activities performance module 202 and the background activities determination module 204 may track background tasks that are being performed and that are pending. The background activities performance module 202 and the background activities determination module 204 may also track the type of background task that is being performed or pending. The background activities performance module 202 and the background activities determination module 204 may track and/or identify types of background activities even if a status request has not been received.

The LoU module 206 may use the information from the background activities performance module 202 and the background activities determination module 204 to generate the LoU indicator. In various embodiments, the LoU module 206 generates the LoU indicator when the status request is received. In some embodiments, the LoU module 206 generates the LoU indicator at any time or at predetermined intervals. In one example, upon receive the status request, the LoU module 206 may provide the most recently generated LoU indicator to the requesting digital device.

In step 318, the control module 200 or the LoU module 206 may provide the LoU indicator to the requesting digital device.

Figure 4:
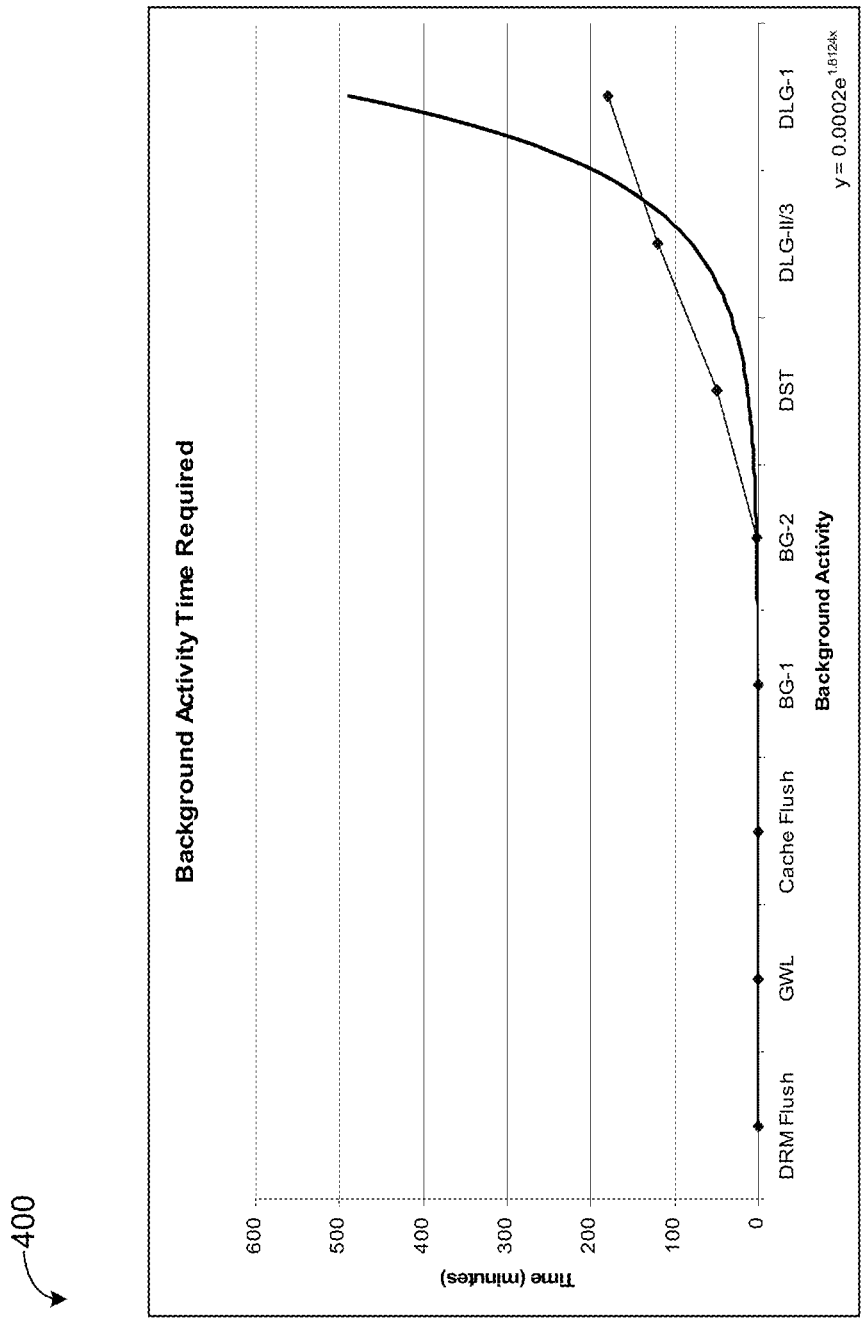
FIG. 4 is a graph depicting time required for background activities in some embodiments.

FIG. 4 is a graph 400 depicting time required for background activities in some embodiments. The y-axis represents time (minutes) while the x-axis represents different background activities. In some embodiments, DRM flush, GWL, and cache flush require very little time to complete. As a result, an LoU indicator may include a value of "0" indicating that the data storage device 110 is readily available without delay. Completing the DLG II/III, however, may require considerable time. As a result, the data storage device 110 may provide a digital device with a value that indicates a large amount of recommend time to complete the background tasks (e.g., in excess of 120 minutes).

The amount of time required for tasks increases as the number of tasks being performed and pending also increase. For example, the amount of time recommended may be in excess of 400 minutes when DST, DLG II/III, and DLG-1 should be performed.

Figure 5:
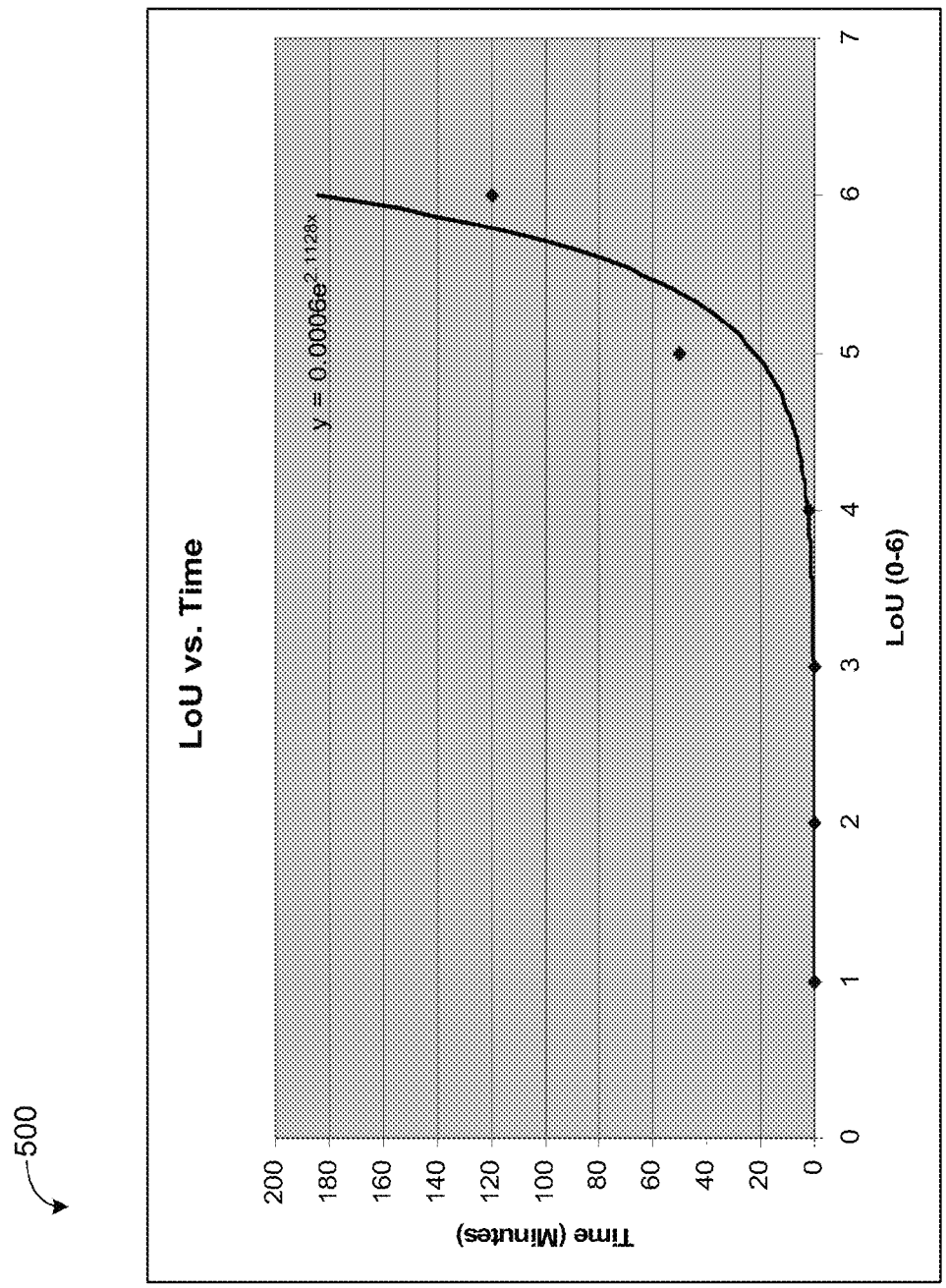
FIG. 5 is a graph depicting a level of urgency associated with time of utilization in some embodiments.

FIG. 5 is a graph 500 depicting a level of urgency associated with time of utilization in some embodiments. The y-axis represents time in minutes while the x-axis represents LoU indicators. The y-axis indicates a range from 0 to 200 minutes while the x-axis represents LoU indicators ranging from 0 to 7. The range of recommended time to complete background tasks associated with LoU indicators may be on a logarithmic scale (e.g., tasks associated with an LoU indicator ranging from values 0 to 4 recommend little time while time associated with each subsequent LoU indicator is considerably more).

In the graph 500 depicts an LoU indicator of less than value 3 as being associated with little recommended time to complete the background tasks. An LoU indicator of value 4 needs more time while it is recommended that an LoU indicator of value 5 should be completed in approximately 50 minutes. A host device that receives an LoU indicator of value 6 may determine that it is recommended that the data storage device 110 should complete tasks within approximately 120 minutes or more.

Those skilled in the art will appreciate that graph 500 is exemplary and that there may be any amount of time associated with different LoU indicators. Further, In some embodiments, the LoU indicator may not be a whole number but rather indicate a value between two or three (e.g., 2.3) for a closer approximation of time recommended to complete the background tasks.

Figure 6:
FIG. 6 is a graph depicting a level of urgency associated with estimated time remaining in some embodiments.

FIG. 6 is a graph 600 depicting a level of urgency associated with estimated time remaining in some embodiments. Graph 600 of FIG. 6 may be at a higher granularity than that depicted in FIG. 5. For example, the y-axis of graph 600 represents time remaining to complete tasks associated with different LoU indicators (see x-axis). An LoU indicator of value 1 indicates 0.2 seconds to complete the background task(s). An LoU indicator of value 2 indicates 5 seconds to complete the background task(s), while an LoU indicator of value 3 indicates 120 seconds to complete the background task(s). An LoU indicator of value 4 indicates 300 seconds to complete the task, while the LoU indicators of values 5 and 6 indicate 3,000 and 7,200 seconds to complete task(s), respectively.

Those skilled in the art will appreciate that the times depicted within the graph 600 are exemplary.

Figure 7:
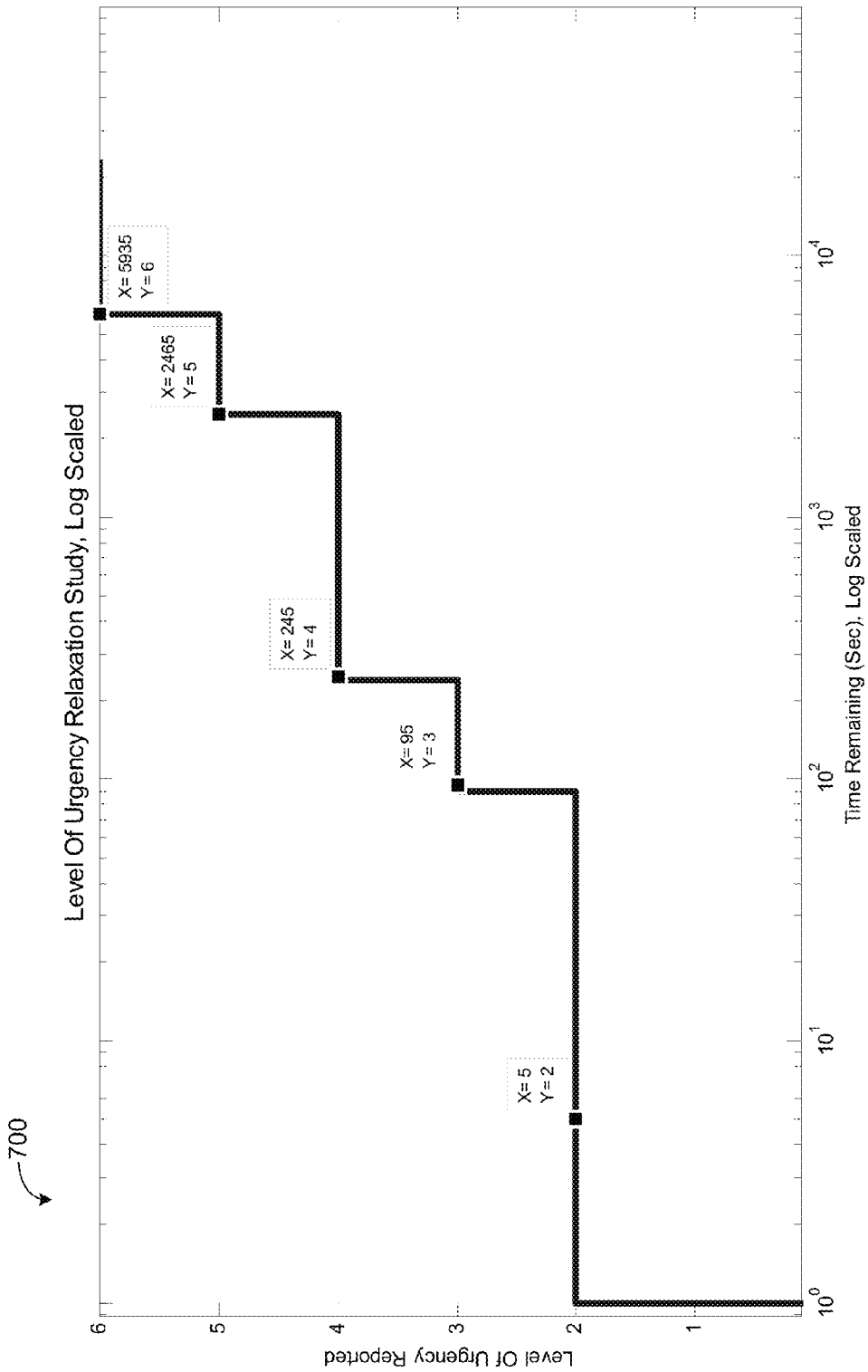
FIG. 7 is a step graph depicting the level of urgency associated with time remaining in some embodiments.

FIG. 7 is a step graph 700 depicting the level of urgency associated with time remaining in some embodiments. The y-axis represents LoU reported from 0 to 6 while the x-axis represents a log scale of time remaining in seconds. Various points have been identified along the step graph 700 as exemplars. For example, point (5, 2) indicates that five seconds is recommended to complete background tasks and that the LoU reported associated with the point is value 2. Point (95, 3) indicates that ninety five seconds is recommended to complete background tasks and that the LoU reported associated with the point is value 3. Further, point (245, 4) indicates that two hundred and forty five seconds is recommended to complete background tasks and that the LoU reported associated with the point is value 4. The penultimate LoU reported in graph 700 is associated with point (2465, 5) which indicates that two thousand, four hundred and sixty five seconds is recommended to complete background tasks and that the LoU reported associated with the point is value 5. Last, point (5935,6) indicates that five thousand, nine hundred and thirty five seconds is recommended to complete background tasks and that the LoU reported associated with the point is value 6.

Those skilled in the art will appreciate that the ranges indicated along the x-axis may be adjusted and the LoU reported/indicator may be associated with different time ranges.

FIG. 8 is a block diagram of an exemplary digital device 800. The digital device 800 comprises a processor 802, a memory system 804, a storage system 806, a communication network interface 808, an I/O interface 810, and a display interface 812 communicatively coupled to a bus 814. The processor 802 is configured to execute executable instructions (e.g., programs). In some embodiments, the processor 802 comprises circuitry or any processor capable of processing the executable instructions.

The memory system 804 is any memory configured to store data. Some examples of the memory system 804 are storage devices, such as RAM or ROM. The memory system 804 can comprise the ram cache. In various embodiments, data is stored within the memory system 804. The data within the memory system 804 may be cleared or ultimately transferred to the storage system 806.

The storage system 806 is any non-transitory storage configured to retrieve and store data. Some examples of the storage system 806 are flash drives, hard drives, optical drives, and/or magnetic tape. In some embodiments, the digital device 800 includes a memory system 804 in the form of RAM and a storage system 806 in the form of flash data. Both the memory system 804 and the storage system 806 comprise a computer readable medium which may store instructions or programs that are executable by a computer processor including the processor 802.

The communication network interface (com. network interface) 808 can be coupled to a network (e.g., communication network 106) via the link 816. The communication network interface 808 may support communication over an Ethernet connection, a serial connection, a parallel connection, or an ATA connection, for example. The communication network interface 808 may also support wireless communication (e.g., 802.11 abg or n, WiMax, or LTE). It will be apparent to those skilled in the art that the communication network interface 808 can support many wired and wireless standards.

The optional input/output (I/O) interface 810 is any device that receives input from the user and output data. The optional display interface 812 is any device that is configured to output graphics and data to a display. In one example, the display interface 812 is a graphics adapter. It will be appreciated that not all digital devices 800 comprise either the I/O interface 810 or the display interface 812.

It will be appreciated by those skilled in the art that the hardware elements of the digital device 800 are not limited to those depicted in FIG. 8. A digital device 800 may comprise more or less hardware elements than those depicted. Further, hardware elements may share functionality and still be within various embodiments described herein. In one example, encoding and/or decoding may be performed by the processor 802 and/or a co-processor located on a GPU (e.g., Nvidia GPU).

The above-described functions and components can be comprised of instructions that are stored on a storage medium such as a computer readable medium. The computer readable medium may be non-transitory. The instructions can be retrieved and executed by a processor (e.g., processor 802). Some examples of instructions are software, program code, and firmware. Some examples of storage medium are memory devices, tape, disks, integrated circuits, and servers. The instructions are operational when executed by the processor to direct the processor to operate in accordance with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention(s). Therefore, these and other variations upon the exemplary embodiments are intended to be covered by the present invention(s).

The invention claimed is:

1. A method comprising:
receiving, from a digital device, a status request requesting availability of a data storage device;
determining if one or more background tasks are being performed by the data storage device;
determining if the one or more background tasks being performed are interruptible;
determining an amount of time required to complete one or more background tasks being performed that should not be interrupted;
determining if one or more background tasks are pending to be performed by the data storage device;
generating a level of urgency indicator in response to the status request, the level of urgency indicator being based on the amount of time required to complete the one or more background tasks that are being performed that should not be interrupted and the determination of the one or more background tasks that are pending to be performed by the data storage device; and
providing the level of urgency indicator to the digital device.

2. The method of claim 1, wherein determining if the one or more background tasks are being performed by the data storage device and determining if the one or more background tasks are pending to be performed by the data storage device are performed before receiving the status request.

3. The method of claim 1, wherein the level of urgency indicator comprises a value that is representative of a recommended amount of time before the data storage device should be available.

4. The method of claim 3, wherein the availability of the data storage device is based on a comparison of the one or more background tasks being performed and are pending with a predetermined threshold.

5. The method of claim 1, wherein the level of urgency indicator comprises an amount of time to complete the one or more background tasks being performed and an amount of time to complete the one or more background tasks to be performed.

6. The method of claim 1, wherein the level of urgency indicator comprises a percentage of performance of the data storage device available to a user based on the determination of the one or more background tasks that are being performed and the determination of the one or more background tasks that are pending to be performed by the data storage device.

7. The method of claim 1, further comprising:
receiving a power management mode request to put the data storage device in a power management mode;
storing the level of urgency indicator within a storage medium of the data storage device; and
reducing power consumption of the data storage device based on the power management mode request.

8. The method of claim 7, wherein providing the level of urgency indicator to the digital device comprises retrieving the level of urgency indicator from the storage medium of the data storage device and providing the level of urgency indicator to the digital device without changing a state of the power management mode.

9. The method of claim 1, further comprising:
determining if the one or more pending background tasks are deferrable;
determining an amount of time required to complete one or more pending background tasks that should not be deferred; and
generating the level of urgency indicator based on the amount of time required to complete the one or more pending background tasks that should not be deferred.

10. A system comprising:
a background activities performance module configured to:

determine if one or more background tasks are being performed by a data storage device;
determine if the one or more background tasks being performed are interruptible; and
determine an amount of time required to complete one or more background tasks being performed that should not be interrupted;
a background activities determination module configured to determine if one or more background tasks are pending to be performed by the data storage device;
a level of urgency module configured to generate a level of urgency indicator based on the amount of time required to complete the one or more background tasks that are being performed that should not be interrupted and the determination of the one or more background tasks that are pending to be performed by the data storage device; and
a control module configured to receive, from a digital device, a status request requesting availability of the data storage device and to provide the level of urgency indicator to the digital device,
wherein the level of urgency module is configured to generate the level of urgency indicator in response to the status request.

11. The system of claim 10, wherein the background activities performance module is configured to determine if one or more background tasks are being performed by the data storage device before the control module receives the status request and the background activities determination module is configured to determine if one or more background tasks are pending to be performed by the data storage device before the control module receives the status request.

12. The system of claim 10, wherein the level of urgency indicator comprises a value that is representative of a recommended amount of time before the data storage device should be available.

13. The system of claim 12, wherein the availability of the data storage device is based on a comparison of the one or more background tasks being performed and are pending with a predetermined threshold.

14. The system of claim 10, wherein the level of urgency indicator comprises an amount of time to complete the one or more background tasks being performed and an amount of time to complete the one or more background tasks to be performed.

15. The system of claim 10, wherein the level of urgency indicator comprises a percentage of performance of the data storage device available to a user based on the determination of the one or more background tasks that are being performed and the determination of the one or more background tasks that are pending to be performed by the data storage device.

16. The system of claim 10, further comprising a power management module configured to:
receive a power management mode request to put the data storage device in a power management mode:
store the level of urgency indicator within a storage medium of the data storage device; and
reduce power consumption of the data storage device based on the power management mode request.

17. The system of claim 16, wherein the power management module is further configured to retrieve the level of urgency indicator from the storage medium of the data storage device without changing a state of the power management mode.

18. The system of claim 10, wherein the background activities determination module is further configured to:

determine if the one or more pending background tasks are deferrable; and
determine an amount of time required to complete one or more pending background tasks that should not be deferred; and
wherein the level of urgency module is further configured to generate the level of urgency indicator based on the amount of time required to complete the one or more pending background tasks that should not be deferred.

19. A non-transitory computer readable medium comprising instructions, the instructions being executable by a processor to perform a method, the method comprising:
receiving, from a digital device, a status request requesting availability of a data storage device;
determining if one or more background tasks are being performed by the data storage device;
determining if the one or more background tasks being performed are interruptible;
determining an amount of time required to complete one or more background tasks being performed that should not be interrupted;
determining if one or more background tasks are pending to be performed by the data storage device;
generating a level of urgency indicator in response to the status request, the level of urgency indicator being based on the amount of time required to complete the one or more background tasks that are being performed that should not be interrupted and the determination of the one or more background tasks that are pending to be performed by the data storage device; and
providing the level of urgency indicator to the digital device.

20. A data storage device comprising:
a background activities performance module configured to
determine if one or more background tasks are being performed by the data storage device;
determine if the one or more background tasks being performed are interruptible; and
determine an amount of time required to complete one or more background tasks being performed that should not be interrupted;
a background activities determination module configured to determine if one or more background tasks are pending to be performed by the data storage device;
a level of urgency module configured to generate a level of urgency indicator based on the amount of time required to complete the one or more background tasks that are being performed that should not be interrupted and the determination of the one or more background tasks that are pending to be performed by the data storage device; and
a control module configured to receive, from a digital device, a status request requesting availability of the data storage device and to provide the level of urgency indicator to the digital device, wherein the level of urgency module generates the level of urgency indicator in response to the status request.

21. The data storage device of claim 20, wherein the background activities performance module is configured to determine if one or more background tasks are being performed by the data storage device before the control module receives the status request and the background activities determination module is configured to determine if one or more background tasks are pending to be performed by the data storage device before the control module receives the status request.

22. The data storage device of claim 20, wherein the level of urgency indicator comprises a value that is representative of a recommended amount of time before the data storage device should be available.

23. The data storage device of claim 22, wherein the availability of the data storage device is based on a comparison of the one or more background tasks being performed and are pending with a predetermined threshold.

24. The data storage device of claim 20, wherein the level of urgency indicator comprises an amount of time to complete the one or more background tasks being performed and an amount of time to complete the one or more background tasks to be performed.

25. The data storage device of claim 20, wherein the level of urgency indicator comprises a percentage of performance of the storage device available to a user based on the determination of the one or more background tasks that are being performed and the determination of the one or more background tasks that are pending to be performed by the data storage device.

26. The data storage device of claim 20, further comprising a power management module configured to:
   receive a power management mode request to put the data storage device in a power management mode;
   store the level of urgency indicator within a storage medium of the data storage device; and
   reduce power consumption of the data storage device based on the power management mode request.

27. The data storage device of claim 26, wherein the power management module is further configured to retrieve the level of urgency indicator from the storage medium of the data storage device without changing a state of the power management mode.

28. The data storage device of claim 20, wherein the background activities determination module is further configured to:
   determine if the one or more pending background tasks are deferrable; and
   determine an amount of time required to complete one or more pending background tasks that should not be deferred; and
   wherein the level of urgency module is further configured to generate the level of urgency indicator based on the amount of time required to complete the one or more pending background tasks that should not be deferred.

* * * * *